United States Patent
Shigeno et al.

(10) Patent No.: US 9,766,267 B2
(45) Date of Patent: Sep. 19, 2017

(54) ACTUATOR POSITION CALCULATION DEVICE, ACTUATOR POSITION CALCULATION METHOD, AND ACTUATOR POSITION CALCULATION PROGRAM

(71) Applicant: Hitachi High-Tech Science Corporation, Minato-ku, Tokyo (JP)

(72) Inventors: Masatsugu Shigeno, Tokyo (JP); Shigeru Wakiyama, Tokyo (JP); Masafumi Watanabe, Tokyo (JP); Kazutoshi Watanabe, Tokyo (JP)

(73) Assignee: Hitachi High-Tech Science Corporation, Minato-ku, Tokyo (JP)

( * ) Notice: Subject to any disclaimer, the term of this patent is extended or adjusted under 35 U.S.C. 154(b) by 658 days.

(21) Appl. No.: 14/221,462

(22) Filed: Mar. 21, 2014

(65) Prior Publication Data

US 2014/0297222 A1 Oct. 2, 2014

(30) Foreign Application Priority Data

Mar. 28, 2013 (JP) .................................. 2013-068436

(51) Int. Cl.
*G01Q 20/02* (2010.01)
*B82Y 35/00* (2011.01)

(52) U.S. Cl.
CPC .............. *G01Q 20/02* (2013.01); *B82Y 35/00* (2013.01)

(58) Field of Classification Search
CPC ........ G01B 21/16; G01Q 20/00; G01Q 20/02; B82Y 35/00

USPC .......................................................... 702/150
See application file for complete search history.

(56) References Cited

U.S. PATENT DOCUMENTS

| 2006/0000263 | A1* | 1/2006 | Su | B82Y 35/00 73/105 |
| 2007/0035266 | A1 | 2/2007 | Sako | |
| 2010/0067021 | A1* | 3/2010 | Danzebrink | B82Y 35/00 356/493 |
| 2010/0100990 | A1* | 4/2010 | Trumper | G01Q 30/00 850/8 |
| 2011/0055982 | A1* | 3/2011 | Watanabe | B82Y 35/00 850/2 |

(Continued)

FOREIGN PATENT DOCUMENTS

| CN | 1661363 A | 8/2005 |
| CN | 1734229 A | 2/2006 |

(Continued)

*Primary Examiner* — Stephanie Bloss
(74) *Attorney, Agent, or Firm* — Banner & Witcoff, Ltd.

(57) ABSTRACT

A device for calculating a position of an actuator, the actuator including a movement mechanism configured to move in one direction in proportion to a control signal generated for each minimum movement amount $\Delta M$ and a movement amount detection sensor configured to detect a movement amount of the movement mechanism in a minimum resolution $\Delta S$, where $A=\Delta S/\Delta M \geq 2$, and the device includes a position calculation unit configured to calculating a position SA of the movement mechanism at a target position from the control signal at a time point T1, at which the sensor signal becomes $(S0+m \times \Delta S)$ or $(S0-m \times \Delta S)$, where m is a natural number of 1 or more, the control signal at the target position of the movement mechanism is denoted by M0, and the sensor signal is denoted by S0.

6 Claims, 3 Drawing Sheets

(56) References Cited

U.S. PATENT DOCUMENTS

| 2011/0131690 A1* | 6/2011 | Novak | B82Y 35/00 |
| | | | 850/43 |
| 2011/0288815 A1* | 11/2011 | Hoshino | G01D 5/145 |
| | | | 702/150 |
| 2012/0303318 A1* | 11/2012 | Milenkovic | A61B 18/18 |
| | | | 702/150 |

FOREIGN PATENT DOCUMENTS

| CN | 1950772 A | 4/2007 |
| JP | H08-201403 A | 8/1996 |
| JP | H09-080060 A | 3/1997 |
| JP | H10-300758 A | 11/1998 |
| JP | H11-271333 A | 10/1999 |
| JP | 2002-214111 A | 7/2002 |
| JP | 2008-224587 A | 9/2008 |

* cited by examiner

ACTUATOR POSITION CALCULATION DEVICE, ACTUATOR POSITION CALCULATION METHOD, AND ACTUATOR POSITION CALCULATION PROGRAM

CROSS-REFERENCE TO RELATED APPLICATIONS

The present application claims priority from Japanese Patent Application No. 2013-068436 filed on Mar. 28, 2013, the entire-subject matter of which is incorporated herein by reference.

BACKGROUND

1. Technical Field

The disclosure relates to an actuator position calculation device, an actuator position calculation method, and an actuator position calculation program, used for driving or the like of a sample stage of a scanning probe microscope.

2. Related Art

A scanning probe microscope measures a surface shape of a sample by making a probe installed at a front end of a cantilever close to or contact with the sample surface. For measurement modes of the scanning probe microscope, there are known (1) a contact mode in which an atomic force between the probe and the sample is maintained to be constant and a surface shape of the sample is measured, and (2) a method (hereinafter, appropriately referred to as a "dynamic force mode (DFM measurement mode)") in which the cantilever is forced to be vibrated around a resonance frequency by a piezoelectric element or the like, and a shape of the sample is measured using the fact that an amplitude of the probe is reduced by intermittent contact between both of the two when the probe is made close to the sample.

The scanning probe microscope is provided with an actuator including: a piezoelectric element which scans the sample in an xy (plane) direction; and a piezoelectric element which scans the sample in a z (height) direction, and the sample is placed on a surface of a sample stage which is disposed on the actuator. A voltage applied to the piezoelectric element is in proportion to a displacement of the piezoelectric element to an extent, and thus height information of the sample surface can be calculated from a voltage applied to the piezoelectric element. However, operational characteristics of the piezoelectric element have hysteresis or creep, and thus it is hard to obtain an accurate position of the piezoelectric element from the applied voltage. Therefore, a technique has been developed in which a displacement of the piezoelectric element in the Z direction is detected using a sensor provided separately from the piezoelectric element (refer to JP-A-9-80060).

SUMMARY

The above-described related-art technology may have some disadvantages. Generally, a position detection resolution of the sensor is lower than a minimum movement amount (movement resolution) of the piezoelectric element. Thus, a high-resolution sensor is necessary to accurately obtain a minute position of the piezoelectric element, but such a high-resolution sensor may be expensive, and this may lead to a cost increase. Further, in a case where a resolution of the sensor is lower than the movement resolution of the piezoelectric element, position detection accuracy may be limited to the resolution of the sensor, and thus the high movement resolution of the piezoelectric element may not be shown.

Therefore, illustrative aspects of the present invention provide an actuator position calculation device, an actuator position calculation method and an actuator position calculation program, capable of calculating a position of a movement mechanism with high accuracy even if a resolution of a movement amount detection sensor is smaller than a minimum movement amount of the movement mechanism, thereby reducing the cost of an actuator.

According to one illustrative aspect of the present invention, there may be provided a device for calculating a position of an actuator, the actuator comprising: a movement mechanism configured to move in one direction in proportion to a control signal generated for each minimum movement amount $\Delta M$; and a movement amount detection sensor configured to detect a movement amount of the movement mechanism in a minimum resolution $\Delta S$, where $A=\Delta S/\Delta M \geq 2$, the device comprising: a signal acquisition unit configured to acquire the control signal for each $\Delta M$ and a sensor signal of the movement amount detection sensor; and a position calculation unit configured to calculate a position SA of the movement mechanism at a target position from the control signal at a time point T1, at which the sensor signal becomes $(S0+m \times \Delta S)$ or $(S0-m \times \Delta S)$, where m is a natural number of 1 or more, and/or from the control signal generated right before the time point T1, where the control signal at the target position of the movement mechanism is denoted by M0 and the sensor signal is denoted by S0.

According to the actuator position calculation device, a position of a movement mechanism can be calculated with high accuracy even if a resolution of a movement amount detection sensor is smaller than a minimum movement amount of the movement mechanism, thereby reducing the cost of an actuator.

According to another illustrative aspect, the position calculation unit may be configured to calculate the position SA by using the following Equation 1, $$SA=(S0+\Delta S/2)-\Delta S \times (2n-1)/2A \qquad \text{Equation 1:}$$

where n is the number of generated control signals from the control signal M0 to the control signal generated right before T1, and $1 \leq n \leq m \times A$.

According to still another illustrative aspect of the present invention, there may be provided a device for calculating a position of an actuator, the actuator comprising: a movement mechanism configured to move in one direction in proportion to a control signal generated for each minimum movement amount $\Delta M$; and a movement amount detection sensor configured to detect a movement amount of the movement mechanism in a minimum resolution $\Delta S$, where $A=\Delta S/\Delta M \geq 2$, the device configured to calculate a rough-estimate position of the movement mechanism from the control signal, and the device comprising: a signal acquisition unit configured to acquire the control signal for each $\Delta M$ and a sensor signal of the movement amount detection sensor; and a position calculation unit configured to: (i) calculate a minimum value and a maximum value of a rough-estimate position of the movement mechanism for each of the same sensor signals, from the control signals which respectively belong to one or more different sensor signals; (ii) obtain an intersection P, at which a straight line or a quadratic curve to which a retrogression analysis is applied intersects the rough-estimate position at M0, the retrogression analysis having the minimum value and maximum value as one variable and the sensor signals as the other variable; and (iii)

calculate a position SA of the movement mechanism at the target position from the intersection P, where the control signal at the target position of the movement mechanism is denoted by M0.

If a sensor signal varies, the sensor signal does not regularly rise by ΔS in accordance with a control signal, and thus it is hard to accurately calculate SA by using Equation 1. For this reason, SA can be calculated with high accuracy by using retrogression analysis.

According to still another illustrative aspect of the present invention, there may be provided a method of calculating a position of an actuator, the actuator comprising: a movement mechanism configured to move in one direction in proportion to a control signal generated for each minimum movement amount ΔM; and a movement amount detection sensor configured to detect a movement amount of the movement mechanism in a minimum resolution ΔS, where A=ΔS/ΔM≥2, the method comprising: acquiring the control signal for each ΔM and also acquiring a sensor signal of the movement amount detection sensor; and calculating a position SA of the movement mechanism at a target position from the control signal at a time point T1, at which the sensor signal becomes (S0+m×ΔS) or (S0−m×ΔS), where m is a natural number of 1 or more, and/or from the control signal generated right before the time point T1, where the control signal at the target position of the movement mechanism is denoted by M0 and the sensor signal is denoted by S0.

According to still another illustrative aspect of the present invention, the calculating of the position may include calculating the position SA by using the following Equation 1, $$SA=(S0+\Delta S/2)-\Delta S\times(2n-1)/2A \qquad \text{Equation 1:}$$

where n is the number of generated control signals from the control signal M0 to the control signal generated right before T1, and $1 \leq n \leq m \times A$.

According to still another illustrative aspect of the present invention, there may be provided method of calculating a position of an actuator, the actuator comprising: a movement mechanism configured to move in one direction in proportion to a control signal generated for each minimum movement amount ΔM; and a movement amount detection sensor configured to detect a movement amount of the movement mechanism in a minimum resolution ΔS, where A=ΔS/ΔM≥2, the device configured to calculate a rough-estimate position of the movement mechanism from the control signal, the method comprising: acquiring the control signal for each ΔM and a sensor signal of the movement amount detection sensor; calculating a minimum value and a maximum value of a rough-estimate position of the movement mechanism for each of the same sensor signals, from the control signals which respectively belong to one or more different sensor signals; obtaining an intersection P at which a straight line or a quadratic curve to which a retrogression analysis is applied intersects the rough-estimate position at M0, the retrogression analysis having the minimum value and maximum value as one variable and the sensor signals as the other variable; and calculating a position SA of the movement mechanism at the target position from the intersection P, where the control signal at the target position of the movement mechanism is denoted by M0.

According to still another illustrative aspect of the present invention, there may be provided a program for calculating a position of an actuator, the actuator comprising: a movement mechanism configured to move in one direction in proportion to a control signal generated for each minimum movement amount ΔM; and a movement amount detection sensor configured to detect a movement amount of the movement mechanism in a minimum resolution ΔS, where A=ΔS/ΔM≥2, the program causing a computer to execute: acquiring the control signal for each ΔM and a sensor signal of the movement amount detection sensor; and calculating a position SA of the movement mechanism at a target position from the control signal at a time point T1, a which the sensor signal becomes (S0+m×ΔS) or (S0−m×ΔS), where m is a natural number of 1 or more, and/or from the control signal generated right before the time point T1, where the control signal at the target position of the movement mechanism is denoted by M0 and the sensor signal is denoted by S0.

According to still another illustrative aspect of the present invention, the calculating of the position may comprise calculating the position SA by using the following Equation 1, $$SA=(S0+\Delta S/2)-\Delta S\times(2n-1)/2A \qquad \text{Equation 1:}$$

where n is the number of generated control signals from the control signal M0 to the control signal generated right before T1, and $1 \leq n \leq m \times A$.

According to still another illustrative aspect of the present invention, there may be provided a program calculating a position of an actuator, the actuator comprising: a movement mechanism configured to move in one direction in proportion to a control signal generated for each minimum movement amount ΔM; and a movement amount detection sensor configured to detect a movement amount of the movement mechanism in a minimum resolution ΔS, where A=ΔS/ΔM≥2, the program causing a computer to execute: calculating a rough-estimate position of the movement mechanism from the control signal; acquiring the control signal for each ΔM and a sensor signal of the movement amount detection sensor; calculating a minimum value and a maximum value of a rough-estimate position of the movement mechanism for each of the same sensor signals, from the control signals which respectively belong to one or more different sensor signals; obtaining an intersection P, at which a straight line or a quadratic curve to which a retrogression analysis is applied intersects the rough-estimate position at M0, the retrogression analysis having the minimum value and maximum value as one variable and the sensor signals as the other variable; and calculating a position SA of the movement mechanism at the target position from the intersection P, where the control signal at the target position of the movement mechanism is denoted by M0.

According to the illustrative aspects of the present invention, it is possible to calculate a position of a movement mechanism with high accuracy even if a resolution of a movement amount detection sensor is smaller than a movement resolution of the movement mechanism, thereby reducing the cost of an actuator.

DETAILED DESCRIPTION

Hereinafter, illustrative embodiments of the present invention will be described with reference to the drawings.

<Actuator Position Calculation Device According to First Illustrative Embodiment>

Figure 1:
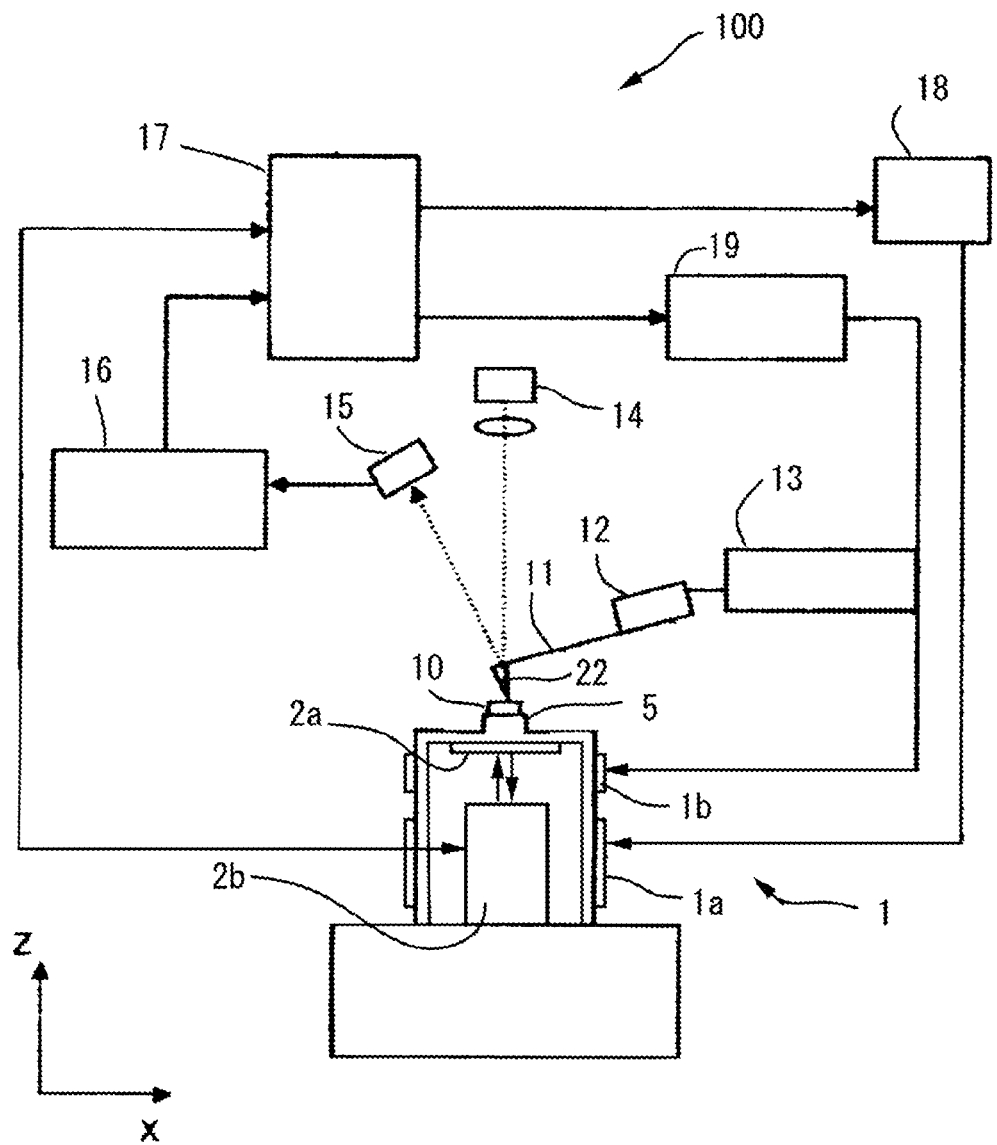
FIG. 1 is a block diagram of a scanning probe microscope including an actuator position calculation device according to a first illustrative embodiment of the present invention.

FIG. 1 is a block diagram of a scanning probe microscope 100 including an actuator position calculation device 17 according to a first illustrative embodiment of the present invention.

In FIG. 1, the scanning probe microscope 100 includes a cantilever 11 having a probe 22 at its front end; a stage 5 on which a sample 10 disposed to face the probe 22 is placed; a cylindrical actuator 1 which moves the sample 10 (stage 5) in a three-dimensional manner; a cantilever vibrating unit 12 which vibrates the cantilever 11; a vibration power source 13 which drives the cantilever vibrating unit 12; a control unit (actuator position calculation device) 17; and the like.

The actuator 1 includes a piezoelectric element 1a which scans the sample 10 in an xy (a plane of the sample 10) direction and a piezoelectric element (corresponding to a "movement mechanism" in the claims) 1b which scans the sample 10 in a z (height) direction, and a mirror 2a is installed on a rear surface of the stage 5 in the actuator 1. The piezoelectric element 1a is connected to an XY driving power source 18, and a predetermined control signal (voltage) is output to the XY driving power source 18 so as to drive the piezoelectric element 1a in the xy direction. Similarly, the piezoelectric element 1b is connected to a Z driving power source 19, and a predetermined control signal (voltage) is output to the Z driving power source 19 so as to drive the piezoelectric element 1b in the z direction. The piezoelectric element is an element in which crystals are deformed when an electric field is applied thereto, and an electric field is generated when the crystals are forced to be deformed by an external force. As the piezoelectric element, lead zirconate titanate (PZT) which is a sort of ceramics may be generally used, but any material may be used.

An optical sensor (movement amount detection sensor) 2b is disposed inside the actuator 1. Light emitted from the optical sensor 2b toward the mirror 2a is reflected and returns to the optical sensor 2b, and thus a position (displacement) of the sample 10 in the z direction is detected. The optical sensor 2b includes, for example, an optical fiber and an optical interferometer. The movement amount detection sensor is not particularly limited, and may be other optical sensors, or an electrical sensor such as a capacitance sensor or a strain gauge.

The control unit 17 is formed by, for example, a personal computer, and includes a control board for controlling an operation of the scanning probe microscope 100, a central processing unit (CPU) (one example of a signal acquisition unit or a position calculation unit), a storage unit such as a ROM and a RAM, an interface, an operation portion, and the like.

In addition, the cantilever 11 is irradiated with laser light by a laser light irradiation unit 14, the laser light reflected by the cantilever 11 is incident to a photodetector 15, and a displacement amount of the cantilever 11 is detected by a cantilever displacement detection unit 16 from the incidence position thereof. In addition, a predetermined control signal is output from the control unit 17 to the Z driving power source 19 so as to drive the piezoelectric element 1b, thereby controlling a relative position of the probe 22 and the sample 10 in the z direction, on the basis of the displacement of the cantilever 11 detected by the cantilever displacement detection unit 16. In other words, the displacement of the cantilever 11 which is generated by an atomic force which acts between the sample 10 and the probe 22 is detected by the above-described mechanism, and a relative position between the probe 22 and the sample 10 is controlled so that a displacement amount of the cantilever 11 is maintained to be constant.

Next, with reference to FIGS. 2 and 3 and Table 1, a description will be made of a process of the control unit 17 calculating a position of the piezoelectric element (movement mechanism) in the z direction. In addition, Table 1 is data on a graph of FIG. 2.

Figure 2:
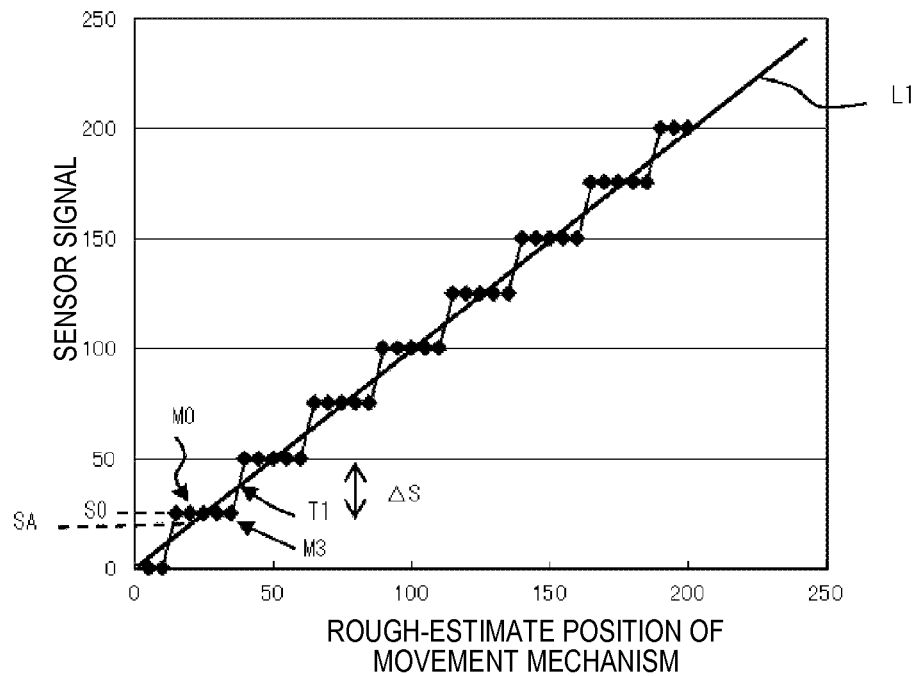
FIG. 2 is a diagram illustrating a process of calculating a position of a piezoelectric element (movement mechanism) in a Z direction in the actuator position calculation device according to the first illustrative embodiment.

FIG. 2 illustrates a relationship between a control signal (=a rough-estimate position of the piezoelectric element 1b) output to the piezoelectric element 1b and a sensor signal (=a measurement position of the piezoelectric element 1b) of the optical sensor 2b. A minute displacement of the piezoelectric element 1b is proportional to a control signal (voltage), and thus a rough-estimate position of the piezoelectric element 1b can be calculated from the control signal. However, operational characteristics of the piezoelectric element 1b have hysteresis or creep, and thus the rough-estimate position is not a true value of the piezoelectric element 1b. Therefore, an accurate position of the piezoelectric element 1b is obtained using the optical sensor 2b.

Here, when a minimum movement amount (movement resolution) of the piezoelectric element 1b is denoted by $\Delta M$, and a minimum resolution of the optical sensor 2b is denoted by $\Delta S$, this gives a relationship $A=\Delta S/\Delta M \geq 2$, and a position detection resolution of the optical sensor 2b is assumed to be lower than a movement resolution of the piezoelectric element 1b.

A range of $2 \leq A \leq 100000$ is preferable, and a range of $2 \leq A \leq 1000$ is more preferable. In addition, the piezoelectric element 1b shows a displacement of, for example, 10 μm/100 V, and can be controlled in a range of 10 μV to 100 μV as a minimum movement amount. Therefore, the movement resolution $\Delta M$ of the piezoelectric element 1b is:

10 μm:100 V=$\Delta M$:10 μV to 100 μV $\Delta M$=(0.0001 μV·V to 0.00 μV·V)/100 V =1 to 10 pm.

On the other hand, a resolution of the optical sensor 2b is generally known to be about 0.05 to 500 nm (50 to 500000 pm), and, particularly, for use in the scanning probe microscope, a resolution of the optical sensor 2b is required to be a high resolution of $\Delta S$=50 to 1000 pm. Therefore, from this value, A becomes $\Delta S/\Delta M$=(50 to 1000 pm)/(1 to 10 pm)=5 to 1000.

$\Delta M$ is considered to be a maximum of a range of 0.1 to 100 pm, and $\Delta S$ is considered to be a maximum of a range of 50 to 500000 pm, which thus gives a range of $0.5 \leq A \leq 5000000$. However, in consideration of actual ranges of $\Delta M$ and $\Delta S$ in the scanning probe microscope, a range of $2 \leq A \leq 100000$ is preferable, and a range of $2 \leq A \leq 1000$ is more preferable.

In addition, in the example of FIG. 2, A=5 ($\Delta M$=100 μV=10 pm, and $\Delta S$=50 pm).

TABLE 1

| control signal | rough-estimate position of movement mechanism | sensor signal |
| --- | --- | --- |
| Ma | 5 | 0 |
| Mb | 10 | 0 |
| Mc | 15 | 25 |
| M0 | 20 | 25 |
| M1 | 25 | 25 |
| M2 | 30 | 25 |

TABLE 1-continued

| control signal | rough-estimate position of movement mechanism | sensor signal |
|---|---|---|
| M3 | 35 | 25 |
| M4 | 40 | 50 |
| M5 | 45 | 50 |
| M6 | 50 | 50 |
| M7 | 55 | 50 |
| M8 | 60 | 50 |
| M9 | 65 | 75 |
| M10 | 70 | 75 |
| M11 | 75 | 75 |
| M12 | 80 | 75 |
| M13 | 85 | 75 |
| M14 | 90 | 100 |
| M15 | 95 | 100 |
| M16 | 100 | 100 |
| M17 | 105 | 100 |
| M18 | 110 | 100 |
| M19 | 115 | 125 |
| M20 | 120 | 125 |
| M21 | 125 | 125 |
| M22 | 130 | 125 |
| M23 | 135 | 125 |

In this case, as illustrated in FIG. 2, $\Delta M$ is five times higher than $\Delta S$ in terms of a resolution. Therefore, if the piezoelectric element 1b is displaced by an amount corresponding to $5 \times \Delta M$ in a direction (corresponding to "one direction" in the claims) in which the probe 22 is separated from the sample 10, this leads to the resolution $\Delta S$ of the optical sensor 2b. Thus, the displacement is detected by the optical sensor 2b, and a sensor signal varies by $\Delta S$. In other words, in a case where the piezoelectric element 1b is moved in the direction in which the probe 22 is separated from the sample 10, one $\Delta S$ increases on the longitudinal axis (sensor signal) every time five control signals are generated on the transverse axis of FIG. 2, and thus the graph has a stepwise shape (the black circles in FIG. 2). In addition, if the piezoelectric element 1b is moved in a direction in which the probe 22 is close to the sample 10, there is a case where the probe 22 or the sample 10 is damaged, and thus a movement direction thereof is limited to the direction in which the probe 22 is separated from the sample 10. However, in a case where the present invention is applied to apparatuses other than the scanning probe microscope, the movement may be performed in an opposite direction as long as the movement is performed in one direction (a positive direction of a sensor signal is a direction in which the movement mechanism contracts).

Therefore, the actuator position calculation device according to the first illustrative embodiment proportionally divides a sensor signal of the optical sensor 2b on the basis of the high movement resolution of the piezoelectric element 1b so as to estimate (calculate) a position SA of the piezoelectric element 1b with high accuracy. Specifically, as illustrated in FIG. 2, an accurate position SA corresponding to a control signal M0 of the piezoelectric element 1b is calculated on an extrapolated line L1 which is obtained by plotting a sensor signal with respect to a rough-estimate position.

In addition, the extrapolated line L1 is a linear function which correlates a rough-estimate position of the piezoelectric element 1b with a sensor signal, and, in a case of FIG. 2, a slope thereof is $\Delta S/(A \times \Delta M)=1$.

In FIG. 2, a control signal at a target position of the piezoelectric element 1b is denoted by M0, and a sensor signal is denoted by S0. The target position of the piezoelectric element 1b is a position where an accurate position SA of the piezoelectric element 1b is desired to be obtained.

A case of obtaining the position SA corresponds to the following SIS mode. For example, in a case where a measurement is performed with the scanning probe microscope of FIG. 1 in the above-described DFM measurement mode, if the probe is brought into contact with the sample at all times, there is a concern that the probe or the cantilever may be transversely bent by a force received from a tilted surface of the sample having large concaves and convexes. Therefore, there is a mode which is referred to as a sampling intelligent scan mode (SIS mode), and, in this mode, a retreat operation is automatically performed in which the probe and the sample contact each other only during acquisition of data, the probe is moved at a high speed in a horizontal direction while retreating over the sample in other cases, and a scanning speed of the probe is reduced and thus the probe rises from the sample surface in a case where the probe seems to contact the sample surface.

As above, in the SIS mode, after the data is acquired, an operation for separating the probe and the sample from each other is performed, and the present invention is applied to the separation operation. In other words, the piezoelectric element 1b is operated by $\Delta M$ in a direction in which the probe 22 is separated from the sample 10 until the sensor signal S0 during the data acquisition is increased by (S0+$\Delta$S), and SA is calculated in the following method. In addition, a measurement is performed again in the SIS mode up to the position SA. Unlike in a normal DFM measurement mode, in the SIS mode of performing an operation for separating the probe from the sample after data is acquired, a measurement according to the present invention is performed during the operation, and thus it is possible to improve measurement accuracy without reducing measurement efficiency.

Figure 3:
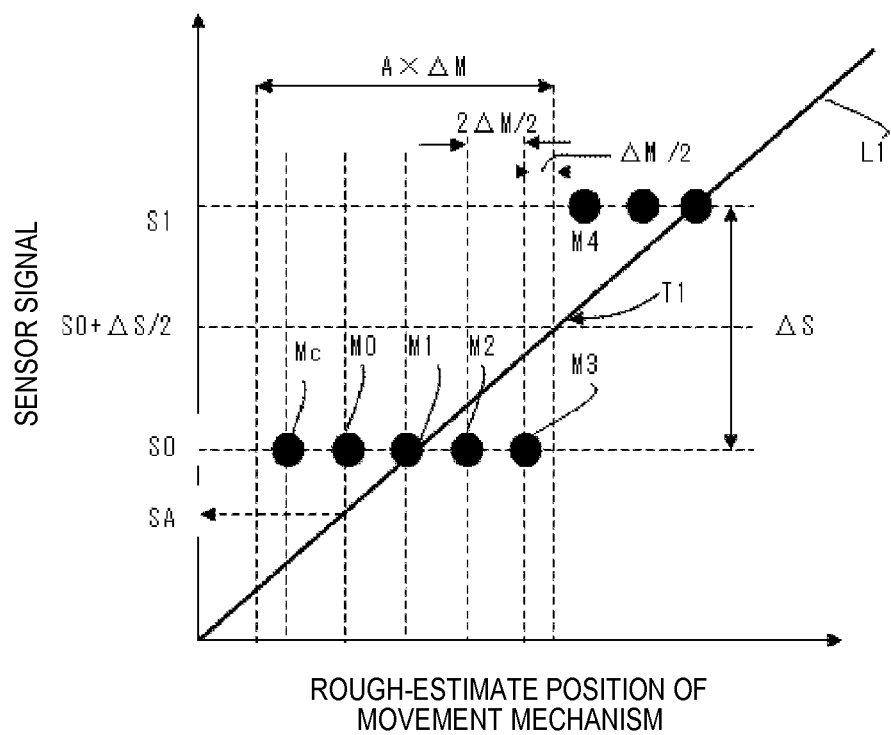
FIG. 3 is a partial enlargement view of FIG. 2.

As illustrated in FIG. 3 which is a partial enlargement view of FIG. 2, the number n of generated control signals from a control signal M0 to a control signal M3 generated right before a time point T1 when the sensor signal increases to (S0+$\Delta$S) is 3. SA can be calculated from an intersection between M0 at this time and the extrapolated line L1. First, if a distance on the transverse axis from the time point T1 to M0 is obtained, each interval on the transverse axis between the adjacent control signals Mc, and M0 to M3 (refer to Table 1) is $\Delta M$ (=2$\Delta M$/2) at the sensor signal S0. On the other hand, an interval between the control signal M3 and the control signal M4 after the sensor signal increases to (S0+$\Delta$S) is also $\Delta M$, but the time point T1 is present between M3 and M4, and thus an interval between the time point T1 and M3 is $\Delta M$/2. This is also the same for the control signal Mc.

For this reason, a distance on the transverse axis from the time point T1 to M3 is $\Delta M/2$ (that is, $\{\Delta M/2+(2\Delta M/2)\times 0\}$), a distance on the transverse axis from the time point T1 to M2 is $\{\Delta M/2+(2\Delta M/2)\times 1\}$, and a distance on the transverse axis from time point T1 to M1 is $\{\Delta M/2+(2\Delta M/2)\times 2\}$. In addition, n=1, 2, and 3 at M3, M2, and M1, respectively. From this, if a distance on the transverse axis from the time point T1 to a specific control signal Mx (where x is a subscript of a sensor signal in Table 1) is generalized, this leads to $\{\Delta M/2+(2\Delta M/2)\times(n-1)\}=\{(\Delta M/2)\times(2n-1)\}$.

Here, since a value of the sensor signal at the intersection between the time point T1 and the extrapolated line L1 is (S0+$\Delta$S/2), a value, which is obtained by subtracting a distance on the transverse axis from the time point T1 to Mx from (S0+$\Delta$S/2), is the value SA (that is, an accurate position of the piezoelectric element 1b at the control signal Mx) of the sensor signal at the intersection between Mx and the extrapolated line L1. This is expressed by Equation 1 as follows.

$$SA = (S0 + \Delta S/2) - \{(\Delta M/2) \times (2n-1)\} \quad (1)$$
$$= (S0 + \Delta S/2) - \{((\Delta S/A)/2) \times (2n-1)\}$$
$$= (S0 + \Delta S/2) - \Delta S \times (2n-1)/2A$$

(where n indicates the number of generated control signals from M0 to a control signal right before T1, and 1≤n≤m×A). In addition, m indicates an integer value (natural number of 1 or more) when the sensor signal increases from S0 to an integer multiple of ΔS, and m=1 in the example of FIGS. 2 and 3.

In the example of FIGS. 2 and 3 and Table 1, a rough-estimate position of the piezoelectric element 1b at the control signal M0 is 20, S0=25, ΔS=25, and A=5, and thus SA is calculated as follows.

$$SA = (S0 + \Delta S/2) - \Delta S \times (2n-1)/2A$$
$$= (25 + 25/2) - 25 \times (2 \times 4 - 1)/10$$
$$= (25 + 25/2) - 25 \times 7/10$$
$$= (25) - 25 \times 1/5$$
$$= 20$$

In other words, as illustrated in FIG. 3, SA is ΔM lower than S0.

In addition, in the example, a case where m=1 has been described, but this is also the same for a case where m≥2. If m≥2, a displacement of a long distance of the piezoelectric element 1b is used to calculate SA, and thus SA can be calculated with high accuracy even if the sensor signal varies due to an influence of disturbance or the like. However, if m≥2, a displacement of the piezoelectric element 1b is required to be lengthened, and thus m is preferably small in order to rapidly calculate SA with a minute displacement of the piezoelectric element 1b.

Although, in the above-described example, the number of generated control signals from the control signal M3 generated right before T1 to the control signal M0 is counted, and SA is calculated, the number of generated control signals from the control signal M4 at T1 to the control signal M0 may be counted, and SA may be calculated. In the latter case, n is incremented by 1.

Next, a description will be made of a process performed by the control unit (a signal acquisition unit or a position calculation unit) 17.

First, the control unit 17 outputs a control signal to the Z driving power source 19 for each ΔM, so as to drive the piezoelectric element 1b. The signal acquisition unit acquires the control signal for each ΔM, and also acquires a sensor signal of the optical sensor 2b. The signal acquisition unit is assumed to also acquire the sensor signal at a timing of acquiring the control signal.

When a control signal at a target position is denoted by M0, and a sensor signal is denoted by S0, the position calculation unit calculates a position SA of the piezoelectric element 1b at the target position, from a control signal M3 generated right before the time point T1, at which the sensor signal becomes (S0+m×ΔS) or (S0−m×ΔS), where m is a natural number of 1 or more. A calculation method is the same as the one described above, and m may be appropriately set by an operator, and may be set to a predetermined value as a default value. In addition, the position calculation unit is assumed to acquire a proportion coefficient of a control signal (voltage) and a rough-estimate position of the piezoelectric element 1b from the ROM or the like as a known value. Further, Equation 1 is stored in the ROM or the like as a program, and the position calculation unit may appropriately read the program so as to perform the calculation of Equation 1.

Incidentally, M0 is detected in the normal DFM measurement mode at a timing when the probe 22 arrives on each measurement point in a surface (horizontal direction) of the scanning probe microscope 100. Further, the arrival of the probe 22 on each measurement point in the surface (horizontal direction) of the scanning probe microscope 100 can be detected by the control unit 17 controlling XY driving of the actuator 1.

M0 is detected in the SIS mode at a timing when the probe 22 arrives on each measurement point in a surface (horizontal direction) of the scanning probe microscope, and the probe 22 becomes close to the sample 10 so as to have an aimed amplitude.

As described above, according to the first illustrative embodiment, even if the resolution of the movement amount detection sensor is smaller than the minimum movement amount of the movement mechanism, a position of the movement mechanism can be calculated with high accuracy, thereby reducing costs.

<Actuator Position Calculation Device According to Second Illustrative Embodiment>

Next, a description will be made of an actuator position calculation device according to a second illustrative embodiment of the present invention with reference to FIGS. 4 and 5 and Table 2. However, the actuator position calculation device according to the second illustrative embodiment is the same as that according to the first illustrative embodiment except that a process performed by the control unit 17 is different.

In the first illustrative embodiment, as illustrated in FIG. 2 and Table 1, the sensor signal does not vary and regularly increases by ΔS each time five control signals are generated, and thus the graph has a stepwise shape. However, if the sensor signal varies, as illustrated in FIG. 4 and Table 2 (the part in brackets in the sensor signal), the sensor signal does not regularly increase by ΔS even if five control signals are generated. Therefore, the sensor signal is deviated from the extrapolated line L1 with a slope of 1, and thus it is hard to calculate accurate SA by using Equation 1.

Figure 4:
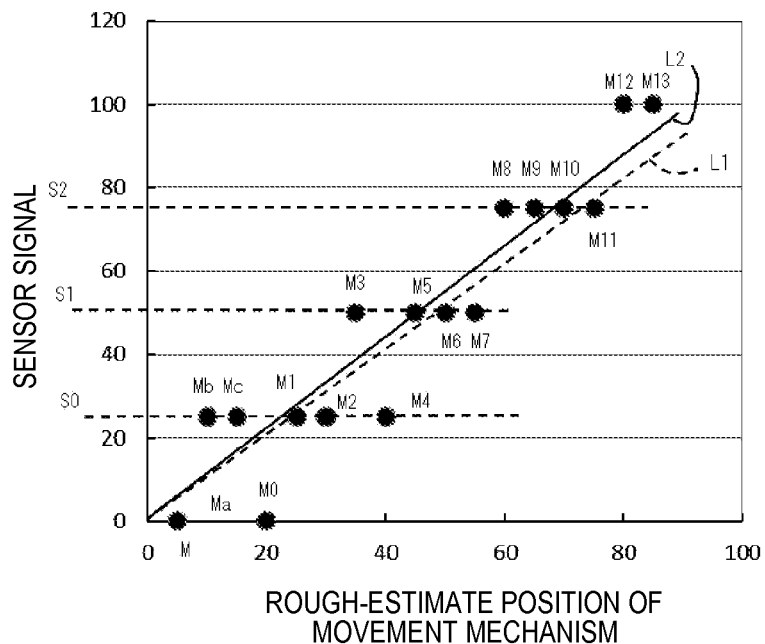
FIG. 4 is a diagram illustrating a process of calculating a position of a piezoelectric element (movement mechanism) in a Z direction in an actuator position calculation device according to a second illustrative embodiment.

Therefore, in the second illustrative embodiment, as illustrated in FIG. 4, a straight line which passes through a center of each step (control signals belonging to the same sensor signal) is obtained using a least-squares method, and this straight line is set as an extrapolated line L2 indicating a correspondence between a sensor signal and a rough-estimate position. In addition, an intersection P at which the extrapolated line L2 intersects a rough-estimate position at M0 is obtained, and SA is calculated from a distance between the intersection and a control signal at a target position.

TABLE 2

| control signal | rough-estimate position of movement mechanism | sensor signal |
| --- | --- | --- |
| Ma | 5 | 0 |
| Mb | 10 | [25] |
| Mc | 15 | 25 |
| M0 | 20 | [0] |
| M1 | 25 | 25 |
| M2 | 30 | 25 |
| M3 | 35 | [50] |
| M4 | 40 | [25] |
| M5 | 45 | 50 |
| M6 | 50 | 50 |
| M7 | 55 | 50 |
| M8 | 60 | [75] |
| M9 | 65 | 75 |
| M10 | 70 | 75 |
| M11 | 75 | 75 |
| M12 | 80 | [100] |
| M13 | 85 | [100] |

Specifically, from control signals which respectively belong to one or more different sensor signals S0, S1 and S2, a minimum value and a maximum value of a rough-estimate position of the piezoelectric element 1b are calculated for each of the same sensor signals S0, S1 and S2.

For example, control signals belonging to S0 are five signals including Mb, Mc, M1, M2, and M4, and thus Mb and M4 among them respectively correspond to a minimum value and a maximum value of a rough-estimate position. Therefore, a minimum value and a maximum value of a rough-estimate position are calculated on the basis of the above-described proportion coefficient of a control signal (voltage) and a rough-estimate position of the piezoelectric element 1b.

Similarly, control signals belonging to S1 are four signals including M3, M5, M6, and M7, and thus M3 and M7 among them are respectively connected to a minimum value and a maximum value of a rough-estimate position. In addition, control signals belonging to S2 are four signals including M8, M9, M10, and M11, and thus M8 and M11 among them are respectively connected to a minimum value and a maximum value of a rough-estimate position. Further, the number of control signals belonging to S1 and S2 is four, and is thus vacant in five which is the stipulated number. Furthermore, for example, M4 has to originally belong to S1 but belongs to S0.

In addition, by using a least-squares method in which the minimum value and maximum value are set as one variable, and the sensor signals S0, S1 and S2 are set as the other variable, the extrapolated line L2 which minimizes a sum of squares of residues from the minimum value and maximum value is calculated.

Figure 5:
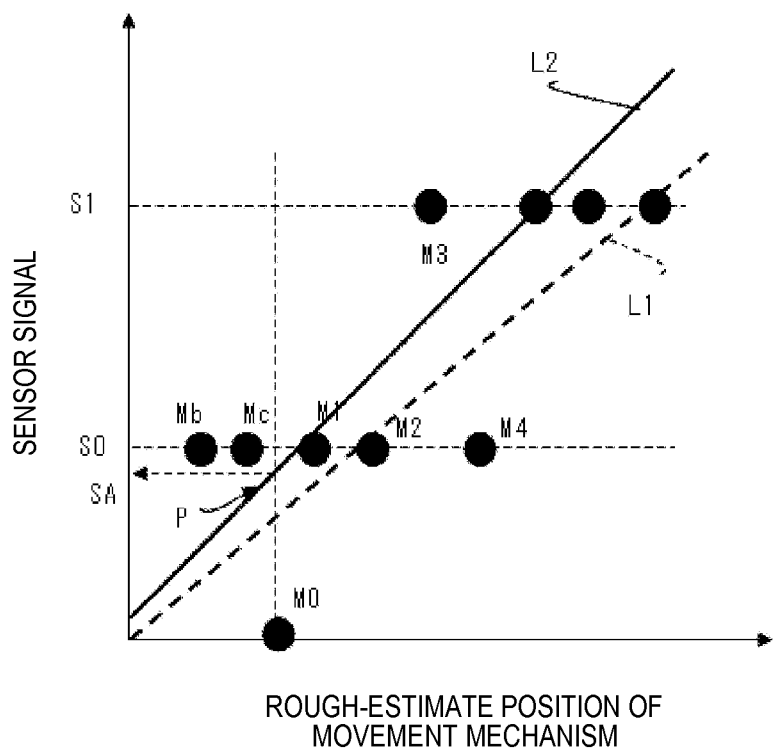
FIG. 5 is a partial enlargement view of FIG. 4.

Next, as illustrated in FIG. 5, the intersection P at which the extrapolated line L2 intersects a rough-estimate position at M0 is obtained, and SA is calculated from the intersection P.

Next, a description will be made of a process performed by the control unit (the signal acquisition unit or the position calculation unit) 17.

First, in the same manner as in the first illustrative embodiment, the control unit 17 outputs a control signal to the Z driving power source 19 for each $\Delta M$, so as to drive the piezoelectric element 1b. The signal acquisition unit acquires the control signal for each $\Delta M$, and also acquires a sensor signal of the optical sensor 2b.

When a control signal at a target position is denoted by M0, as described above, the position calculation unit calculates a minimum value and a maximum value of a rough-estimate position for each of the same sensor signal, from control signals which respectively belong to the sensor signals S0, S1 and S2. In addition, by using a least-squares method with the minimum value and maximum value as one variable and the sensor signals as the other variable, the extrapolated line L2 is calculated. Further, the intersection P at which the extrapolated line L2 intersects a rough-estimate position at M0 is obtained, and the position SA is calculated from the intersection P.

As described above, according to the second illustrative embodiment, even if the resolution of the movement amount detection sensor is smaller than the minimum movement amount of the movement mechanism, a position of the movement mechanism can be calculated with high accuracy, thereby reducing costs.

Particularly, as illustrated in FIG. 5, if the sensor signal varies, the control signal M0 at the target position is considerably deviated from both of the extrapolated lines L1 and L2, and thus SA cannot be calculated from Equation 1. Therefore, by obtaining the intersection P at which the extrapolated line L2 intersects a rough-estimate position at M0, SA can be calculated in the same manner as in a case where the sensor signal does not vary.

In addition, in the second illustrative embodiment, data used in the least-squares method for obtaining the extrapolated line L2 may not be necessarily a control signal belonging to the sensor signal S0. However, if control signals belonging to the sensor signal S0 which is (to be) output by M0 are used in the least-squares method, data around M0 is reflected, and thus this is preferable. In this case, since M0 itself does not output the sensor signal S0, for example, a sensor signal (there is only S0 in FIG. 5, but Mc and M1 may respectively belong to different sensor signals) to which the control signals Mc and M1 adjacent to M0 belong may be set to be necessarily used in the least-squares method.

Further, in the second illustrative embodiment, the retrogression analysis, in which the minimum value and maximum value of the rough-estimate position are set as one variable and the sensor signals are set as the other variable, is not limited to the above-described straight line, and may be applied to a quadratic curve.

The piezoelectric element 1b is less influenced by hysteresis in a short-distance movement, and a movement amount thereof can be approximated using a linear function of a voltage, and thus it is possible to perform the retrogression analysis (least-squares method) by the use of the above-described straight line. However, if a movement distance of the piezoelectric element 1b becomes long, an influence of hysteresis increases, and thus approximation of a movement amount as a quadratic function of a voltage can increase accuracy.

The present invention is not limited to the illustrative embodiments, and may be applied to, for example, the piezoelectric element 1a which is displaced in the xy direction. In addition, the present invention is not limited to the scanning probe microscope, and may be applied to, for example, an actuator of a mask positioning mechanism of an exposure device such as a stepper.

What is claimed is:
1. A device for calculating a position of an actuator, the actuator comprising: a movement mechanism configured to move in one direction in proportion to a control signal generated for each minimum movement amount $\Delta M$; and a movement amount detection sensor configured to detect a movement amount of the movement mechanism in a minimum resolution ΔS, where A=ΔS/ΔM≥2, the device comprising:
a processor; and
a memory storing instructions, the instructions, when executed by the processor, causing the device to perform:
generating the control signal for a driving power source to drive the movement mechanism each minimum movement amount ΔM;
acquiring the control signal for each ΔM and a sensor signal generated by the movement amount detection sensor having the minimum resolution ΔS;
calculating a position SA of the movement mechanism at a target position from:
a value of (S0+m×ΔS) or (S0−m×ΔS);
a number n of generated control signals from a control signal M0 to a control signal at a time point T1 or to a control signal generated right before T1; and
a value of A=ΔS/ΔM,
where the time point at which the sensor signal becomes (S0+m×ΔS) or (S0−m×ΔS) is denoted by T1, where m is a natural number of 1 or more and 1≤n≤m×A, and the control signal at the target position of the movement mechanism is denoted by M0 and the sensor signal is denoted by S0; and
controlling movement of the movement mechanism based on the calculated position SA.

2. The device according to claim 1, wherein, when the sensor signal changes at (S0+m×ΔS) and m=1, the calculating of the position comprises calculating the position SA by using the following Equation 1, $$SA=(S0+4S/2)-\Delta S \times (2n-1)/2A.$$  Equation 1:

3. A method of calculating a position of an actuator, the actuator comprising: a movement mechanism configured to move in one direction in proportion to a control signal generated for each minimum movement amount ΔM; and a movement amount detection sensor configured to detect a movement amount of the movement mechanism in a minimum resolution ΔS, where A=ΔS/ΔM≥2, the method comprising:
generating the control signal for a driving power source to drive the movement mechanism each minimum movement amount ΔM;
acquiring the control signal for each ΔM and also acquiring a sensor signal generated by the movement amount detection sensor having the minimum resolution ΔS;
calculating a position SA of the movement mechanism at a target position from:
a value of (S0+m×ΔS) or (S0−m×ΔS);
a number n of generated control signals from a control signal M0 to a control signal at a time point T1 or to a control signal generated right before T1; and
a value of A=ΔS/ΔM,
where the time point at which the sensor signal becomes (S0+m×ΔS) or (S0−m×ΔS) is denoted by T1, m is a natural number of 1 or more and 1≤n≤m×A, and the control signal at the target position of the movement mechanism is denoted by M0 and the sensor signal is denoted by S0; and
controlling movement of the movement mechanism based on the calculated position SA.

4. The method according to claim 3, wherein when the sensor signal changes at (S0+m×ΔS) and m=1, the calculating of the position includes calculating the position SA by using the following Equation 1, $$SA=(S0+4S/2)-\Delta S \times (2n-1)/2A.$$  Equation 1:

5. A non-transitory computer-readable medium having a computer program for calculating a position of an actuator stored thereon and readable by a computer, the actuator comprising: a movement mechanism configured to move in one direction in proportion to a control signal generated for each minimum movement amount ΔM; and a movement amount detection sensor configured to detect a movement amount of the movement mechanism in a minimum resolution ΔS, where A=ΔS/ΔM≥2, the computer program, when executed by the computer, causes the computer to perform operations comprising:
generating the control signal for a driving power source to drive the movement mechanism each minimum movement amount ΔM;
acquiring the control signal for each ΔM and a sensor signal generated by the movement amount detection sensor having the minimum resolution ΔS;
calculating a position SA of the movement mechanism at a target position from:
a value of (S0+m×ΔS) or (S0−m×ΔS);
a number n of generated control signals from a control signal M0 to a control signal at a time point T1 or to a control signal generated right before T1; and
a value of A=ΔS/ΔM,
where the time point at which the sensor signal becomes (S0+m×ΔS) or (S0−m×ΔS) is denoted by T1, m is a natural number of 1 or more and 1≤n≤m×A, and the control signal at the target position of the movement mechanism is denoted by M0 and the sensor signal is denoted by S0; and
controlling movement of the movement mechanism based on the calculated position SA.

6. The non-transitory computer-readable medium according to claim 5, wherein when the sensor signal changes at (S0+m×ΔS) and m=1, the calculating of the position comprises calculating the position SA by using the following Equation 1, $$SA=(S0+\Delta S/2)-\Delta S \times (2n-1)/2A.$$  Equation 1:

* * * * *